United States Patent [19]

Broom

[11] Patent Number: 5,008,035
[45] Date of Patent: Apr. 16, 1991

[54] FLUIDIZATION OF HEAVY SLURRIES
[75] Inventor: Henry T. Broom, Richmond, Tex.
[73] Assignee: Nalco Chemical Company, Naperville, Ill.
[21] Appl. No.: 521,954
[22] Filed: May 11, 1990

Related U.S. Application Data

[62] Division of Ser. No. 132,836, Dec. 14, 1987, Pat. No. 4,949,743.

[51] Int. Cl.$^5$ .................. B01J 13/00; B01F 17/14; B01F 17/42
[52] U.S. Cl. .................. 252/312; 252/351; 252/356; 44/281
[58] Field of Search .................. 252/8.554, 312, 351, 252/356; 44/51, 301, 303, 281

[56] References Cited

U.S. PATENT DOCUMENTS

| 3,396,105 | 8/1968 | Burdyn et al. | 252/8.554 X |
|---|---|---|---|
| 3,583,486 | 6/1971 | Stratton | 252/8.554 X |
| 3,620,303 | 11/1971 | Halbert, Jr. | 252/8.554 X |
| 3,811,504 | 5/1974 | Flournoy et al. | 252/8.554 X |
| 4,197,197 | 4/1980 | Abaeva et al. | 252/312 X |
| 4,355,651 | 10/1982 | McClaflin | 252/312 X |
| 4,814,094 | 3/1989 | Blair, Jr. et al. | 252/8.554 |

FOREIGN PATENT DOCUMENTS 2082163  3/1982  United Kingdom .

OTHER PUBLICATIONS

CA97 (4):28531a, The Use of Polyacrylamide as Flocculating Agent, V. B. Mather; D. M. Brahmankar-1982-Indian Drugs 19(8), 323-5.
CA105 (16):136366t, The Effect of Carboxymethyl Cellulose on the Flotation and Surface Properties of Graphite-J. A. Solari; A. C. De Araujo; J. S. Laskowski--1986-Coal Prep. (Gordon & Breach), 3(1), 15-31.
CA102 (18):154319x, Sludge Dewatering, Jpn. Kokai Tokkyo Koho JP 59/230699 A2 (84/230699), 25 Dec. 1984, 5 pages, Appl. 83/106330, 14 Jun. 1983.
CA96 (24):204922u, Jpn. Kokai Tokkyo Koho, Jp 57/32797 A2(82/32797), Feb. 22, 1982, 8 pages, Appl. 80/108213, Aug. 8, 1980, 1982.
CA96 (16):129182x, Jpn. Kokai Tokkyo Koho, JP 56/161897 A2(81/161897), Dec. 12, 1981, 4 pages, Appl. 80/65409, May 19, 1980, 1981.
CA 94(26):214072q, Jpn. Kokai Tokkyo Koho, JP 55/145509 (80/145509), Nov. 13, 1980, 3 pages, Appl. or Pr. 79/51358, Apr. 27, 1979, 1980.
CA 98(6):40132z, Appl. 81/16866, Feb. 9, 1981, 1982.
CA98 (6):40047a, Municipal Sewage Water Treatment-Some Colloid Chemical Aspects, Jean C. Le Bell, Stockholm S-114 86, Swed. Vatten, 38(3), 294-305, 1982.
CA 97(6):40551q, Evaluation of Flocculating Agents with a New Testing Apparatus, Bernhard Borchers, Zellst. Pap. (Leipzig), 31(3), 117-20, 1982.
CA99 (20):163482s, Coagulation and Sedimentation in Chemical Precipitation of Wastewaters, Jean C. LeBell; Per Stenius; Claes Axberg Water Res., 17(9), 1073-80, 1983.
CA98 (18):149429c, Purification of Water, Pieter Walter William Buchan; Leon Buchan, Eur. Pat. Appl. EP 66421 A1, Dec. 8, 1982, 23 pages, Designated States BE, DE, FR, GB, IT, NL, SE, Appl. 82/301570, May 20, 1982; ZA Appl. 81/3427, May 21, 1981; ZA Appl. 81/4437, Jun. 30, 1981; ZA Appl. 81/6505, Sep. 18, 1981, 1982.
CA106 (14):107470n, Sludge Dewatering, Kazumasa Watanabe; Masamitsu Oshima-Jpn. Kokai Tokkyo Koho JP 61/204100 A2 (86/214100), Sep. 10, 1986, 6 pages, Appl. 85/44607, Mar. 8, 1985, 1986.
CA94 (12):85235u, Cellulose Derivatives as Flocculants Compared with some Fully Synthetic Products, H. L. Doppert; J. K. Schuilenburg, Int. Dissolving Pulps Conf., (Conf. Paper) 5th, 140-6 TAPPI; Atlanta, Ga., 1980.
CA93 (24):226259y, Study of the Absorption of Carboxymethyl Cellulose and Polycarylamide on Ca- (List continued on next page.)

Primary Examiner—Richard D. Lovering
Assistant Examiner—Daniel S. Metzmaier
Attorney, Agent, or Firm—Donald G. Epple

[57] ABSTRACT

A process for fluidizing oily heavy slurries chosen from slurries of catalyst fines in hydrocarbon, coke slurries in hydrocarbon, and asphalt residues in hydrocarbon which comprises:

(1) heating, with effective mixing, the oily heavy slurries to at least 140° F., thereby forming a heated heavy slurry;

(2) Adding to said heated heavy slurry with effective mixing, an effective fluidizing amount of a fluidizing agent which comprises the ingredients:

| Ingredient | Wt. Percent |
|---|---|
| (a) water | 15-85 |
| (b) an ethoxylated nonyl phenol/ formaldehyde resin having a molecular wt. between about 1000-25,000 | 40-5 |
| (c) Surfactants having an HLB between about 2.0-25.0, said surfactants chosen from the group consisting of alkanolamide condensates, alkoxylated fatty alcohol phosphates and mixtures thereof; and | 40-5 |
| (d) liquid organic solvents chosen from the group consisting of naphthas, aromatic naphthas, heavy aromatic naphthas, alkylated aromatics, light aromatic petroleum distillates, turpentine, dipentene rich turpentine, and mixtures thereof; thereby forming a heated treated heavy slurry, and then mixing effectively until the heated treated heavy slurry becomes fluidized and pumpable. | 75-5 |

2 Claims, No Drawings

OTHER PUBLICATIONS tion-Substituted Forms of Montmorillonite, N. S. Ivanova; F. F. Mozheiko Vestsi Akad. Navuk BSSR, Ser. Khim Navuk, (5), 112–117, 1980.

CA93 (4):33260w, Physicochemical and Rheological Investigation of Inorganic Suspensions, IX, Coagulation and Flocculation of Particle, Mieczyslaw Gorecki, Acta Pol Pharm., 36(6), 591–6, 1979.

CA92 (2):11056y, Turbid Water Clarification, Koichi Hahazato; Mitsuo Yamawaki, Jpn. Kokai Tokkyo Koho JP 54/132352(79/132352), Oct. 15, 1979, 5 pages, Appl. or Pr. 78/39741, Apr. 6, 1978, 1979.

CA91 (16):128620y, Flocculation-Separation of Starch from Wastewater, Katsuo Shinoda; Kozo Kanamori; Michio Kusaka, Jpn. Kokai Tokkyo Koho JP 54/69252 (79/69252), Jun. 4, 1979, 5 pages, Appl. or Pr. 77/137985, Nov. 14, 1977, 1979.

CA91 (12):96488t, Flocculant for Clarifying Surface Waters, K. H. Talibdzhanov; G. N. Zinina; A. Abidkhanov, U.S.S.R. SU 659575, Apr. 30, 1979 from: Otkrytiya, Izobret., Prom. Obraztsy, Tovarnye Znaki 1979, (16), 118 Appl. or Pr. 2479277, Apr. 25, 1977, 1979.

CA90 (8):56575s, Determination of the Substitution—Grade of Soluble CMC by means of Polyelectrolyte Titration, Luu Trong Hong; Bodo Borrmeister; Horst Dautzenberg; Burkart Phipipp Zellst. Pap. (Leipzig, 27 (5), 207–10, 1978.

CA89 (20):168583d, Treatment of Solid-Containing Waste Waters, Hikosaburo Hashisaki, Japan, Kokai JP 53/74748 (78/74748), Jul. 3, 1970, 3 pages, App. or Pr. 76/151426, Dec. 15, 1976, 1978.

CA89 (16):135251r, Flocculation Treatment of Wastewaters, Ieaki Yamafuju; Shozo Sasaki; Masamichi Kimura; Shinichi Hayakawa, Japan Kokai JP 53/69458 (78/69458), Jun. 20, 1978, 6 pages, Appl. or Pr. 76/143507, Dec. 1, 1976, 1978.

CA89 (14):117467m, Use of Carboxymethyl Cellulose for Improving the Quality of Surface Water Purification, A. Abidkhanov; G. N. Zinina; E. G. Amosova, Deposited Doc., Viniti 4053–76, 13 pages, Avail. Viniti, 1976.

CA89 (12):94600h, Effect of Water Soluble Polyanions of the Removal of Organic Substances by a Metal Coagulant from Fisheries Waste Water, Eiichi Nishide, Nihon Daigaku, Nojuigakubu Gakujutsu, Kenkyu Hokoku, 35, 335–41, 1978.

CA89 (8):64679y, Improvement of Silt Filtration, Ryonosuke Abe; Hisae Kamono; Yasuhisa Osada; Yoshinori Kasuga, Japan Kokai JP 52/148953 (77/148953), Dec. 10, 1977, 3 pages, Appl. or Pr. 76/65560, Jun. 7, 1976, 1977.

CA88 (12):78925s, Removal of Suspended Particles from Water, A. Abidkhanov; Kh. Talibdzhanov; G. N. Zinina; A. Kh. Ginzburg, U.S.S.R. SU 579226, Nov. 5, 1977, From: Otkrytiya, Izobret., Prom. Obraztsy, Tovarnye Znaki 1977, 54(41), 76 Appl. or Pr. 2301159, Dec. 19, 1975, 1977.

CA87 (14):106395u, Coagulation of Fishery Waste Water with Organic Coagulants, Eiichi Nishide, Nihon Daigaku, No-Juigakubu Gakujutsu, Kenkyu Hokoku, 34, 291–4, 1977.

CA86 (16):111075y, Treatment of Industrial Water in the Production of Asbestos-Cement, Vladimir Vyplel, Czech. CS 163311, Jun. 15, 1976, 2 pages, Appl. or Pr. 73/6599, Sep. 25, 1973.

CA85 (22):166096r, Decrease of Total Suspension Solids Content in Waste Waters from the Pulp and Paper Industry Using Coagulant Chemical Agents, Elena Strugariu, Rev. Padurilor-Ind. Lemnului, Celul. Hirtie, Celul. Hirtie, 25(1), 27–34, 1976.

CA84 (18):126319p, Sewage Treatment with Activated Fly Ash and Regenerated Alum Sludge, M. Adhikari; S. K. Gupta; B. Banerjee, J. Inst. Chem., Calcutta, 47, Pt. 5, 165–9, 1975.

CA84 (10):60713d, Electrocoagulation of Water-Soluble Polymers, Kazuo Nishizawa, Japan, Kokai, JP 50/140546 (75/140546), Nov. 11, 1975, 4 pages, Appl. or Pr. 74 33,891, Mar. 28, 1974.

CA84 (4):21842a, Treatment of Waste Waters Containing Water-Soluble High Molecular Weight Compounds with Montmorillonite and Metallic Compounds, Kazuju Fukunaga; Kuniyuki Kano, Japan Kokai JP 50/94042 (75/94042), Jul. 26, 1975, 7 pages, Appl. or Pr. 73 97,079, Aug. 28, 1976.

CA83 (12):102941p, Composition for Removing Cationic Materials from Industrial Waste Waters, Hans Wegmueller; Jaroslav Haase, Ger. Offen. DE 2451776, May 15, 1975, 39 pages, CH Appl. 15,716/73, Nov. 8, 1973.

CA83 (4):30217g, Recovering Noil Fibers and Soluble Wood Material from Waste Water, Esko K. Brax, U.S. US 3873418, Mar. 25, 1975, 6 pages, Appl. or Pr. 9937, Feb. 9, 1970.

CA83 (2):15300k, Treatment of Waste Dyeing Solution, Kosuke Tomita; Hiroaki Ida; Hiroshi Matoba; Katsutoski Yoshihara, Japan Kokai JP 49/116857 (74/116857), Nov. 8, 1974, 3 pages, Appl or Pr. 73 28,764, Mar. 12, 1973.

CA82 (16):102894e, Treatment of Oil Spills Using Basic Polymer Oil-Ball Forming Agents, Keiji Abe; Shigeru Tomita; Yoshindo Matsuda; Kazuki Terajima; Tadao Kanayama, Japan. Kokai JP 49/89687), Aug. 27, 1974, 4 pages, Appl. or Pr. 73 1588, Dec. 27, 1972.

CA82 (2):7476m, Purification of Waste Water by Coagulative Precipitation, Akio Okamoto; Yoritaka Kudo, Japan. Kokai JP 49/71755), Jul. 11, 1974, 3 pages, Appl. or Pr. 72 113,668, Nov. 13, 1972.

CA81 (16):95971b, What are the Agents Used for Retention and as Flocculants, Werner Auhorn, Papeterie, 96(5), 289–90, 293–9, 1974.

CA81 (12):68127z, Synthesis of Previously Unknown Water-Soluble Graft Copolymers having the Qualities of Flocculants, Tr. Nauchnoizsled. Inst. Vodosnabdyavane, Kanaliz. Sanit. Tekh, 8(2), 179–98, 1973.

CA79 (16):96652u, Treating Dye Waste Waters with Carboxyl Compound and Polyvalent Metallic Compounds, Takehiko Kano, Japan, Kokai JP 48/33181 (73/33181), May 8, 1973, 3 pages, Appl. or Pr. 71 65,428, 26 Aug. 1971.

CA79 (16):95133p, Improvements in the Action of High-Molecular-Weight Flocculants During the Flota- (List continued on next page.)

OTHER PUBLICATIONS tion Beneficiation of Potassium Ores Using Additives of Iron and Aluminum Inorganic Salts, Kh. M. Aleksandrovich; F. F. Mozheiko; A. P. Yanovskaya; N. S. Ivanova Khim. Prom (Moscow), 49 (6), 439–42, 1973.

CA79 (10):55450h, Flocculating Oil-and Clay-Containing Slimes, William J. Lang; Donald A. Hentz, U.S. US 3723310, Mar. 27, 1973, 5 pages, Appl. or Pr. 864,518, Oct. 7, 1969.

CA78 (14):86175f, Retention and Flocculation Mechanisms, Jan Fellegi, Pap. Celul., 27(11), 213–16, 1972.

CA78 (2):7539b, Caogulation of Paper Mill Wastes by Polyelectrolytes, Shizuo Suzuki, Eisei Kagaku, 18(4), 274–7, 1972.

CA77 (26):166465v, Recovery of Fibers and Fillers from Paper Industry Waste Water, Oszkar Libor, Ger. Offen. DE 2121198, Aug. 31, 1972, 27 pages, HU Appl. TA/1104, Feb. 22, 1971.

CA77 (18):116365s, Characterization by Differential Thermal Analysis of Organic Polyelectrolytes and Flocculating Agents, Charles B. Concilio; Betty J. Jahnke, Thermochimica Acta, 4(3), 249–255, 1972.

CA76 (14):73156j, Behavior of Water-Soluble Cellulose Ethers Toward Electrolytes, Werner Hansi; Walter Klaus; Karl Mercator, Deut. Farben-Z, 25(10), 493–8, 1971.

CA75 (6):38684n, Apparatus for Separating Water from Hydrocarbons, John R. Winston; Roy E. Hook, U.S. US 3,583,904, Jun. 8, 1971, 6 pages, Jan. 22, 1969.

CA73 (26):132140n, Removal of Pulp in White Water by Coagulation, Shizuo Suzuki, Kogyo Yosue, No. 122, 35–9, 1968.

CA73 (10):48468t, Water Clarification, Oscar Libor; Gyorgy Kollar, Hung. HU 157437, Apr. 22, 1970, 13 pages.

CA71 (24):114345n, Behavior of Water-Soluble Cellulose Ethers Towards Electrolytes and Organic Solvents, Werner Hansei; Walter Klaus; Karl Mercator, Wiesbaden-Biebrich, Ger. Deut. Farben-Z, 23(7), 305–10, 1969.

FLUIDIZATION OF HEAVY SLURRIES

This is a divisional application pending from patent application 07/132,836, filed Dec. 14, 1987, now U.S. Pat. No. 4,949,743, issued Aug. 21, 1990.

INTRODUCTION

In operating petroleum processing plants, particularly when these operations include catalytic operations using heterogeneous catalysts, the processor is faced with a problem of separating catalysts fines from by product streams, which problem poses a major problem for environmental controls, utilization of plant equipment, and cost and expenditures.

In addition to these catalysts fine slurries, other oily heavy slurries include slurries containing coke or asphalt components dispersed in high viscosity hydrocarbons. These heavy slurries which contain catalyst fines, including accumulated alumina/silica zeolitic catalyst fines which settle from hydrocarbon cuts obtained from fluid catalytic cracking units, and which heavy slurries can also include coke slurries and asphalt slurries in hydrocarbon dispersing solvents, when accumulated have a tendency to settle into a very heavy slurry phase and lighter hydrocarbon phase. The hydrocarbon phase most normally can be pumped from on top of the heavy slurries, but this leaves the heavy slurry accumulated in tankage, in lines, and posing tremendous operating problems for the oil refiner.

It would be an advance in the art if one could easily treat these oily heavy slurries in such a manner as to make them dispersible and pumpable, thereby permitting them to be pumped to disposing operations such as incinerators, and the like.

THE INVENTION

My invention is a process for fluidizing oily heavy slurries chosen from slurries of catalyst fines in hydrocarbon, coke slurries in hydrocarbon, and asphalt residue slurries in hydrocarbon, which process comprises:
(1) Heating, with effective mixing, the oily heavy slurries to at least 140° F., thereby forming a heated heavy slurry;
(2) Adding to said heated heavy slurry, with effective mixing, an effective fluidizing amount of a fluidizing agent comprising:

| Ingredient | Wt. Percent |
|---|---|
| (a) water | 15–85 |
| (b) an ethoxylated nonyl phenol/ formaldehyde resin having a molecular wt. between about 1000–25,000; | 40–5 |
| (c) Surfactants having an HLB between about 2.0–25.0, said surfactants chosen from the group consisting of alkanolamide condensates, alkoxylated fatty alcohol phosphates and mixtures thereof; and | 40–5 |
| (d) liquid organic solvents chosen from the group consisting of naphthas, aromatic naphthas, heavy aromatic naphthas, alkylated aromatics, light aromatic petroleum distillates, turpentine, dipentene rich turpentine, and mixtures thereof; thereby forming a heated treated heavy slurry, and then mixing effectively until the heated treated heavy slurry becomes fluid and pumpable. | 75–5 |

The temperatures at which these ingredients are admixed with the oily heavy slurries should be at least 140° F., preferably between 150°–200° F., and most preferably between about 160°–190° F.

By the term effective mixing we mean to include any form of agitation or mixing which can evenly and homogeneously disperse the fluidizing ingredients in, into and and among the heavy oily slurries. This mixing can be accomplished by inserted mixers or may be accomplished by circulation pumping into and through the vessel in which the oily heavy slurries have settled. Mixing may also include ultrasound mixing or any other physical technique that can accomplish the admixture of the fluidizing amount of the fluidizing ingredients into and throughout the oily heavy slurries.

THE FLUIDIZING INGREDIENTS

The fluidizing ingredients are preferrably admixtures which contain water, an ethoxylated nonyl phenol-formaldehyde resin, and of various types of surfactants having hydrophilic-lipophilic balances (hereinafter HLB) ranging between about 2.0–25.0, said surfactants being chosen from the group consisting of alkanolamide condensates, alkoxylated fatty phosphates, and any effective admixture thereof. When admixtures are used, the HLB of the admixture may also range from between 2–25. To this formulation, organic solvents are added which solvents may include any of the typical and inexpensive organic crude oil cuts such as naphthas, aromatic naphthas, heavy aromatic naphthas, alkolated aromatics, light aromatic petroleum distillates, or such other solvents such as turpentines, dipentene rich turpentines, or any admixture of the above type ingredients which admixture may also include other common solvents such as cyclohexane, toluene, ethylbenzene and such other types of organic solvents as may readily be available.

The ingredients which appears to be active in the dispersion of these oily heavy slurries and which help to achieve the ability to fluidize and pump these slurries seems to be the admixture of water, the ethoxylated nonyl phenol-formaldehyde resins, and the particular surfactants described above and below, in admixture with organic solvents. It is particularly useful to have present both water and organic solvents in combination with the ethoxylated nonyl phenol-formaldehyde resin and the surfactants or admixture of surfactants..

The ethoxylated nonyl phenol-formaldehyde resin normally has a molecular weight ranging between about 1000–25,000 as the weight average molecular weight as determined by gel permeation chromotography. Preferably the molecular weight ranges between about 2500–20,000 and most preferably the molecular weight ranges between about 5–15,000. These ethoxylated nonl phenol -formaldehyde resins are made by condensing nonyl phenol and formaldehyde followed by ethoxylation using anywhere from 1–20 moles of ethylene oxide per mole of nonyl phenol /formaldehyde to achieve the ethoxylated nonl phenol-formaldehyde of this resin. Preferably the mole ratio of ethoxylate to nonyl phenol/formaldehye in the final product ranges between about 1–10 moles ethylene oxide per mole of the base alkyl substituted phenol-formaldehyde resin, and most preferably between about 1 to about 6 moles ethylene oxide per mole of base resin.

The surfactants which are found to be most useful are the surfactants or any combination or admixture of surfactants having an HLB between about 2.0-25.0, and which surfactants are chosen from the group consisting of alkoxylated fatty alcohol phosphates and alkanol amide condensates.

The alkanol amide condensate which is preferred is represented by the structure

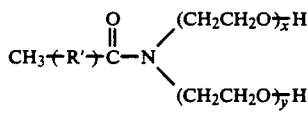

wherein R' represents an hydrocarbonaceous bridging group containing from 1-20 carbon atoms and chosen from the group consisting of linear and branched alkylene, alkyaryl, aralkyl, cyclic, and mixtures thereof. In the structure above x ranges from 0-8, y independently ranges from 0-8, provided that the sum of x+y is at least 1.

Of particular interest is the alkanolamide condensate represented as formula 1 above where R' is a hydrocarbonaeous bridging group having from 4-20 carbon atoms and chosen from linear or branched alkylene, alkaryl, aralkyl, and cyclic groups and mixtures of these groups. Preferably x and y range individually from 0-8, provided that the sum of x+y is at least 2. Most preferably, these alkanolamide condensates have R' ranging from 6-15 carbon atoms and chosen from either linear or branched alkylene groups, and have x or y both individually chosen from integers ranging from about 0-4, provided that the sum of x+y is at least 2.

The alkoxylated fatty alcohol phosphates are represented by the formulas below:

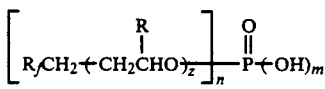

wherein $R_f$ is a fatty alkyl group having from 6-30 carbon atoms and being linear or branched or mixture thereof; R is hydrogen, methyl, or mixtures thereof; z ranges from between 1-12; n is at least 1; and m is equal to $3-n$; and where, in the sum, $n+m$ must always equal 3.

The ethoxylated nonyl phenol-formaldehyde resin, alkanolamide condensates, and alkoxylated fatty alcohol phosphates are normally present in the fluidizing formulations in weight ratios ranging from about 1:1:1 to about 20:10:0 to about 20:0:10. Preferably the weight ratios are between about 1:1:1 to about 20:10:1 to about 20:1:10.

These fluidized ingredients are added in an effective amount to the oily heavy slurries to achieve, with effective mixing, fluidization of these slurries to the point where they may be pumped using standard refinery equipment and pumps. Normally, this process requires at least 1000 ppm of a combination of the ethoxylated nonyl phenol-formaldehyde resin having a molecular weight ranging between 1000-25,000 and having been manufactured by reacting from about 25-75 weight percent ethylene oxide from about 75-25 weight percent of the nonyl phenol-formaldehyde base resin, said resin having itself been formed by reacting nonyl phenol with paraformaldehyde in a mole ratio ranging between about 1.5:1 to about 1:1.5. The combination also then includes the alkanolamide condensates represented by the structures outlined above as well as the alkoxylated fatty alcohol phosphates represented by the structures outlined above. The weight ratio of the ethoxylated nonyl phenol-formaldehyde: alkanol amide condensate: alkoxyated fatty alcohol phosphate ranges between about 1:1 to about 20:10:1 to about 20:1:10, when effectively used in these oily heavy slurries at a concentration of at least 1000 ppm, and in the presence of at least 5 weight percent water based on the total amount of oily heavy slurry to be treated.

A preferred process includes the treatment of the oily heavy slurries with at least 5 weight percent water, preferably between 5-25 weight percent water and at least 1000 ppm each of:
(a) a nonyl phenol/formaldehyde resin ethoxylated with from 25-75 weight percent, based on resin, of ethylene oxide, and
(b) a combination of a weight ratio of 3:1 to 1:3 of a mixture of the alkanolamide condensates outlined above with the alkoxylated fatty alcohol phosphates outlined above, and further wherein the alkanolamide condensate is defined in a way that the bridging group contains from 6-16 carbon atoms and is linear or branched alkylene functionality and x and y both range from 0-4 provided that the sum of x+y is at least 2. Also, in this preferred technique, the alkoxylated fatty alcohol phosphate is defined such that $R_f$ contains 8-18 carbon atoms and is linear or branched alkyl functionality, z ranges from 1-8, n ranges between 1-2, and m is $3-n$.

Preferably the composition useful for fluidizing oily heavy slurries comprises from 15-85 weight percent water, from 5-40 weight percent of the ethoxylated nonyl phenol-formaldehyde resin having a molecular weight ranging between about 5000-15,000; and from 5-40 weight percent of the combination of the alkanolamide condensates represented by the structures above, wherein R' in a hydrocarbonaceous bridging group has from 1-20 carbon atoms and is chosen from linear or branched alkalene groups, alkylene groups, aralkyl groups, cyclic functionality or mixtures thereof with the alkoxylated fatty alcohol phosphate represented by the structures above, where $R_f$ is fatty alkyl group having from 6-30 carbon atoms and chosen from linear or branched alkyl functionality, R is, at each occurrence, hydrogen, methyl or mixtures thereof, z is from 1-12, n ranges from 1-3, m is $3-n$ and sum $n+m$ must always be 3. Preferably each of the surfactants are present individually at levels of from 2.5-20 weight percent.

Each of these prior ingredients are then admixed with a hydrocarbon solvent, present between 5-75 weight percent, which solvent is chosen from the group consisting of naphthas, aromatic naphthas, heavy aromatic naphthas, alkylated aromatics, light aromatic solvents, petroleum distillates, turpentines, dipentene rich turpentines, and/or mixtures thereof.

To better describe our invention the following examples are given.

A Southwestern refinery had a tank containing a mixture of coke fines and very heavy oils. The material when analyzed contained between 70-90% coke fines. This mixture at ambient temperatures of from 60°-90° F. appeared to be semi-solid. The refinery could not remove this mixture from the tank in which it was stored in a way that it could be fed to an incinerator or any other waste handling facility. The refiner requested assistance.

One gallon of this semi-solid mixture was heated to a temperature of about 165° F. for a period of between 10-14 hours. At 165° F. this sample was blended by mixing, and aliquots of the admixture placed in several prescription bottles. To each of these bottles were added formulations which in turn were various combinations of water, emulsifiers, organic liquid solvents, and the phenol-formaldehyde resins described above. Other surfactants were also attempted.

The only combination which achieved a fluidized and pumpable admixture when the heavy coke fine slurries were treated in this way were formulations which contained the alkoxylated fatty alcohol phosphates, the alkanol amide condensates, and the ethoxylated nonyl phenol-formaldehyde resins described above. In particular, the best fluidization of these coke fines heavy slurries were achieved by adding a formulation, which, when added to the coke fine slurries, yielded a total water content of 5 weight percent and 1500 ppm each of an ethoxylated fatty alcohol phosphate known as ethoxylated oleyl alcohol phosphate provided commercially as EMPHOS ™ PS-810 and an alkanolamide condensate known as N, N-(2-hyroxyethyl)-lauramide, both materials available commercially. These materials had been admixed prior to addition to the coke slurry with 5 weight percent of the indicated alkanolamide condensate, 5 weight percent of the indicated EMPHOS PS-810, 2.5 weight percent of a dipentene rich turpentine oil, and 87.5 weight percent of a heavy aromatic naphtha. The alkanolamide condensaate is available commercially as WITCOMID ™ 5138 which is a water dispersible non-ionic surfactant. This blend was admixed prior to treating the coke slurry with an ethoxylated nonyl phenol-formaldehyde resin which contained about 5-6 moles of ethylene oxide per mole of nonyl phenol-formaldehyde resin and which had a molecular weight ranging between about 2500-10,000, as determined by gel permeation chromotography.

The treated coke slurry which contained 5 weight percent water and 1500 ppm each of the nonyl phenol resin described above and a 1:1 combination of the 2 surfactants described above remained fluid after cooling to room temperature and sitting for a period of about 8 hours. It would have been easily pumpable using standard reciprocating pumps, or other pumping means, available in a refinery.

EMPHOS is a trademark of Witco Chemical Co. WITCOMID is a trademark of Witco Chemical Co.

A second experiment was tried using a cracking catalyst sludge which contained alumina/silica catalytic cracking fines in an oil slurry obtained from a refiner on the East Coast of the United States. Again, using an effective amount of a formulation which contained 5 weight percent water, and equal mixtures of the nonyl phenol-formaldehyde resin described above with, in turn, a 50/50 mixture of the EMPHOS PS-810 and the WITCOMID 5138, and all three organic actives dispersed in an aromatic solvent containing a dipentene rich turpentine oil achieved fluidization of these semi-solid cracking catalysts sludges. However, to maintain fluidity over a period of time, it was necessary to additionally add between about 0.5 and 5.0 volume percent, based on total slurry volume, of isopropyl alcohol, or another water miscible alcohol, to maintain the stable and pumpable slurry originally achieved by the treatment of these cracking catalysts sludges as described.

Having described my invention, I claim:

1. A composition useful for fluidizing oily heavy slurries, which comprises:

| Ingredient | Wt. Percent |
|---|---|
| (a) water | 15-85 |
| (b) an ethoxylated nonyl phenol-formaldehyde resin having a molecular weight ranging between about 1000-25,000 | 40-5 |
| (c) an alkanolamide condensate represented by: $$CH_3 (R')C(=O)-N\begin{array}{c}(CH_2CH_2O)_xH \\ (CH_2CH_2O)_yH\end{array}$$ wherein R' is a hydrocarbonaceous bridging group having from 1-20 carbon atoms and chosen from linear or branched alkylene, alkaryl, aralkyl, cyclic and mixtures thereof; x and y are, individually, from 0-8, provided that the sum of x + y is at least 1; | 20-2.5 |
| (d) an alkoxylated fatty alcohol phosphate represented by: $$\left[ R_fCH_2(CH_2CHO)_z \Big|_{R} \right]_n - P(=O)(OH)_m$$ wherein: $R_f$ is a fatty alkyl group having from 6-30 carbons and being linear or branched; R is H, $CH_3$, or mixture thereof; z is between 1-12; n is from 1-3; m is 3 − n; and the sum of n + m is 3. | 20-2.5 |
| (e) A hydrocarbon solvent chosen from the group consisting of naphthas, aromatic naphthas, heavy aromatic naphthas, alkylated aromatics, light aromatic petroleum distillates, turpentines, dipentene rich turpentine, and mixtures thereof. | 75-5 |

2. The composition of claim 1 wherein:
the ethoxylated nonyl phenol resin has a molecular weight ranging between about 5000-15000; and
the alkanolamide condensate is represented by R' having from 4-18 carbon atoms and chosen from linear or branched alkylene groups, or mixtures thereof, and therein x and y are, individually, from 0-4 provided the sum of x+y is at least 2; and
the alkoxylated fatty alcohol phosphate is represented by $R_f$ ranging from 6-16 carbon atoms; z is from 2-8, and n is from 1-2.

* * * * *